(12) United States Patent
Forlong

(10) Patent No.: US 6,842,961 B2
(45) Date of Patent: Jan. 18, 2005

(54) METHODS AND APPARATUS FOR A LINEAR GUIDING DEVICE

(76) Inventor: Murray Forlong, PO Box 45026, Te Atatu, Auckland (NZ)

( * ) Notice: Subject to any disclaimer, the term of this patent is extended or adjusted under 35 U.S.C. 154(b) by 218 days.

(21) Appl. No.: 10/158,052

(22) Filed: May 31, 2002

(65) Prior Publication Data

US 2002/0194721 A1 Dec. 26, 2002

Related U.S. Application Data

(60) Provisional application No. 60/294,949, filed on May 31, 2001.

(51) Int. Cl.[7] .............................................. B23Q 3/00
(52) U.S. Cl. ..................................................... 29/464
(58) Field of Search ............................. 29/407.09, 464, 29/468; 408/234; 409/235, 238; 74/422; 384/57, 59, 45, 38

(56) References Cited

U.S. PATENT DOCUMENTS

| | | | | |
|---|---|---|---|---|
| 4,264,112 A | * | 4/1981 | Magnuson | 384/29 |
| 4,637,738 A | * | 1/1987 | Barkley | 384/38 |
| 4,884,898 A | * | 12/1989 | Magnuson | 384/57 |
| 5,076,714 A | * | 12/1991 | Teramachi | 384/45 |
| 5,176,454 A | * | 1/1993 | Schlereth | 384/45 |
| 5,249,867 A | * | 10/1993 | Iida | 384/57 |
| 5,329,825 A | * | 7/1994 | Askins | 384/38 |
| 6,155,716 A | * | 12/2000 | Okamura et al. | 384/7 |
| 6,325,576 B1 | * | 12/2001 | Kosmowski | 408/234 |
| 6,672,763 B1 | * | 1/2004 | Tschetschorke | 384/9 |

* cited by examiner

Primary Examiner—David P. Bryant
(74) Attorney, Agent, or Firm—Young & Thompson

(57) ABSTRACT

A compensating device assembly and method for tolerating mis-alignment of a machine mounting on linear guides supported by a moving axis is disclosed. The compensating device includes a plurality of mounting blocks wherein the blocks include at least one datum block and at least three non datum blocks each attached to a support structure wherein the non datum blocks have error alignment element. The alignment element is provided by slots therein and sliding friction therebetween for errors in alignment between the blocks can be accommodated to thereby reduce the loads induced in the guides from misalignment.

20 Claims, 4 Drawing Sheets

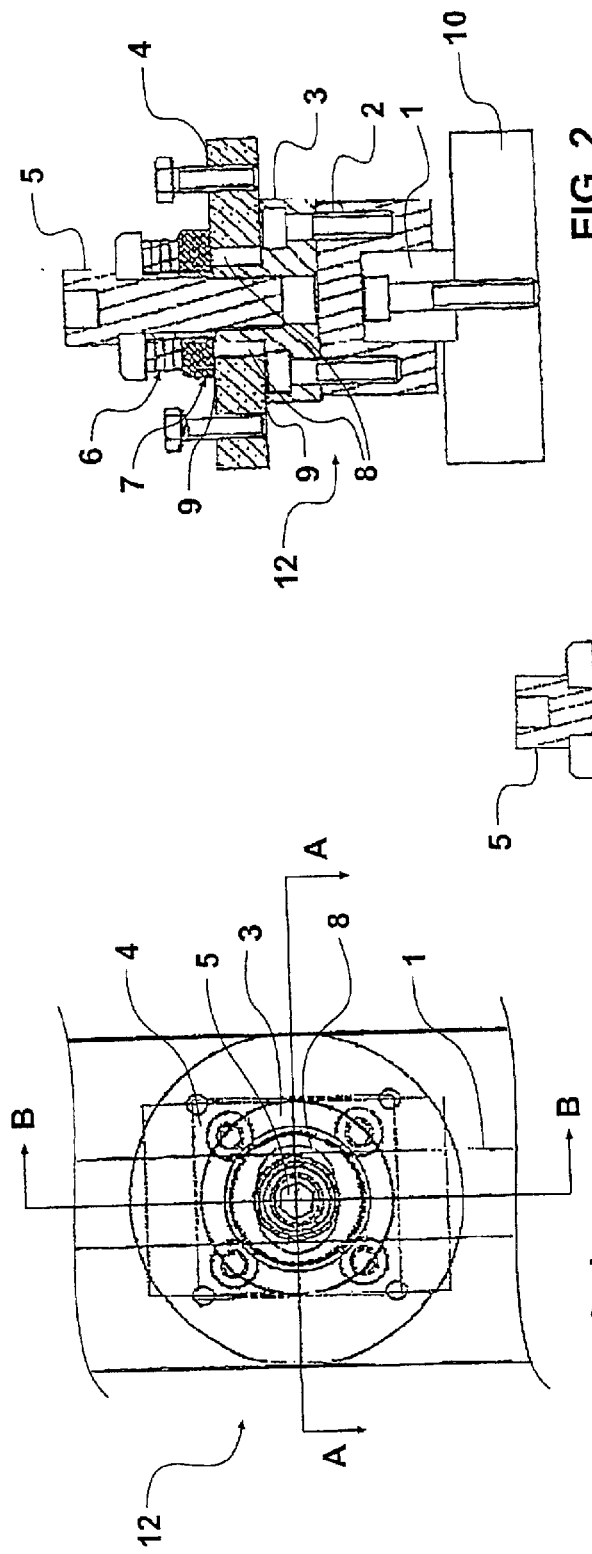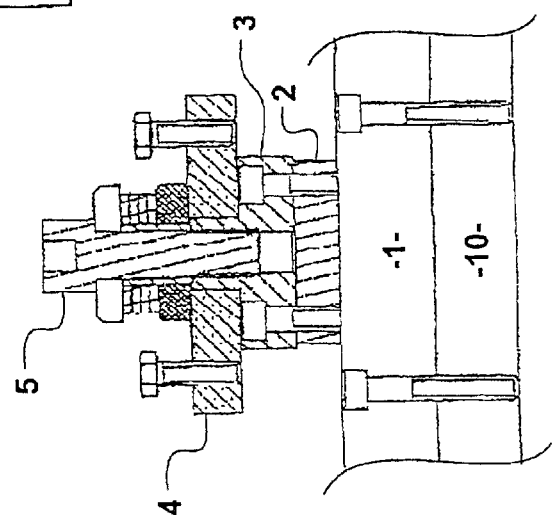

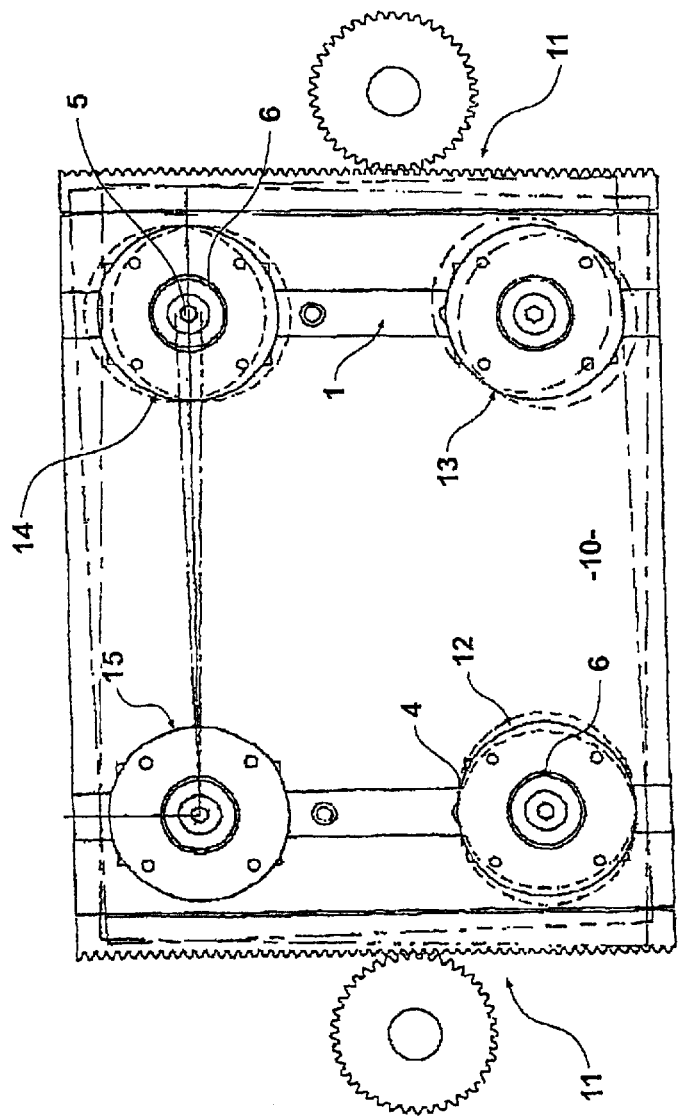
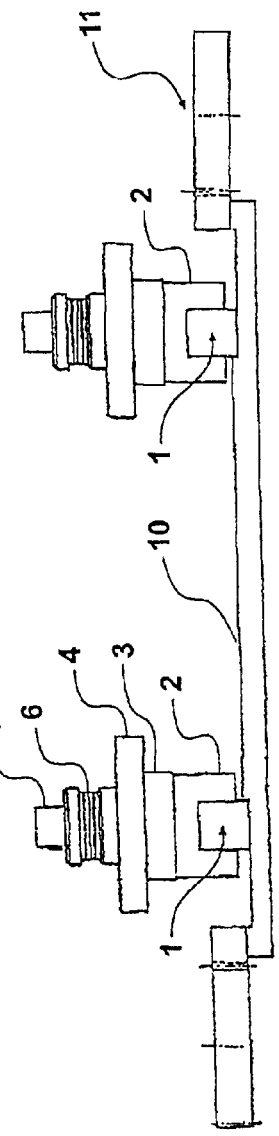
FIG. 6
FIG. 7

METHODS AND APPARATUS FOR A LINEAR GUIDING DEVICE

The content of my co-pending U.S. Patent Application, filed on even date herewith, entitled "Methods and Apparatus for a Control of a Material Processing Device", is incorporated herein by reference in its entirety.

BACKGROUND OF THE INVENTION

This invention relates generally to the use of linear guides and, more specifically, to apparatus and methods for automatically compensating for some misalignment occurring between two linear guides.

In mechanical devices such as machine tools, it is common to have two linear guides supporting a moving axis. To ensure accurate movement, the linear guides should have substantially no clearance or minimal clearance between respective rails and bearings.

When two or more linear guides are employed together, with little or no clearance, then the linear alignment of the two guides needs be very precise. The rails should be both parallel and co-planar level i.e. should be in the same plane.

If the guides are not precisely parallel and level, then unacceptably high loads can be imposed on the guides, which reduces the guide life.

A typical method for configuring two linear guides for controlling one axis is to mount the two guides onto a machined surface against shoulders which control the errors in misalignment due to the machining accuracies of the surface and shoulders.

In applications where two linear recirculating ball bearing block guides are spaced apart and cannot be reasonably connected, the accuracy of alignment of the two guides for parallel and level is around 0.001 inches. In applications where linear guides are mounted independently relative to each other, with no machined items to control their respective positions, linear guides are typically not feasible to use, as the loads generated by misalignment lead to premature failure.

In machine tools, however, linear recirculating ball bearing block guides are often the preferred method of linear guide, due to their smoothness, load carrying capacity, debris protection, and the fact that if damage occurs, replacement parts can simply be bolted into place without the need for any machining of the guide systems.

SUMMARY OF THE INVENTION

It is therefore an object of the present invention to provide an improved apparatus and methods for a linear guiding device which will obviate or minimise the foregoing disadvantages in a simple yet effective manner or which will at least provide the public with a useful choice.

It has been discovered that when two linear guides are used to guide a moving axis, a compensating device can be used to accommodate errors in alignment between these two guides, thereby reducing the loads induced in the guides from misalignment, resulting in longer service life.

Accordingly in a first aspect the invention consists in a compensating device assembly for tolerating mis-alignment of a machine mounting on linear guides supported by a moving axis, the compensating device includes a plurality of mounting blocks wherein the blocks include at least one datum block and at least three non datum blocks each attached to a support structure wherein the non datum blocks have error alignment means wherein the alignment means is provided by slots therein and sliding friction therebetween for errors in alignment between the blocks can be accommodated to thereby reduce the loads induced in the guides from misalignment.

Preferably the friction sliding for alignment correction occurs on both surfaces of the surfaces of the machine connection element rather than between the linear guide and the support.

Preferably each block is provided with a bearing, a pin mount block, a machine connection element and tension fixing assembly wherein the bearing is slidably connected to the linear guide, the pin mount block is connected to the bearing, the machine connection element is connected to the pin mount block by the fixing assembly.

Preferably the slots are located in machine connection element such that the pin mount block and tension fastener pass therethrough.

Preferably the linear guides on a moving axis include at least two substantially parallel support rails mounted on each side of a movable platform, the platform having sides and a length.

Preferably the tension fixing assembly includes a tension means, spring assembly and sliding washer.

Preferably the spring assembly permits the linear bearing to be rotationally out of level. Preferably the platform is movable by operation of a moving means attached to each side of the platform.

Preferably the moving means comprises a rack and pinion assembly.

Preferably the pin mount block is a linear recirculating ball bearing block.

Preferably the connection element has the slot to allow for adjustment wherein the block is a slider block.

Preferably the connection element has no slot to allow for adjustment wherein the block is a datum block.

In a second aspect the invention consists in a method of compensating for misalignment of a machine mounting on a moving axis, the moving axis includes a plurality of linear guides on a movable support structure wherein the compensating device comprises a plurality of mounting blocks attached to the movable support structure, wherein errors in alignment between the blocks can be accommodated to thereby reduce the loads induced in the linear guides from misalignment, by carrying out the following steps:

a) providing a datum block assembly having mating surfaces therebetween;
b) providing at least one non datum block assembly;
c) Attaching and fixing datum block to the linear guide on a linear guide support structure;
d) Attaching and fixing non-datum blocks to the linear guide;
e) Affixing a machine to the blocks;
f) While pivoting on the datum block, adjusting the non-datum blocks till horizontally in alignment so that sliding occurs between the mating surfaces of the block assembly rather than between the linear guide and the support.

The method of tolerating mis-alignment as disclosed in the preceding paragraph wherein the non-datum blocks have a slot for adjustable horizontal movement.

The method of tolerating mis-alignment as disclosed in the preceding paragraph wherein each block is provided with a bearing, a pin mounting block, a machine connection element and adjustable fixing assembly wherein the bearing is slidably connected to the linear guide, the pin mounting block is connected to the bearing, the machine connection element is connected to the pin mounting block by the tension fixing assembly.

The method of tolerating mis-alignment as disclosed in the preceding paragraph wherein the sliding is between surfaces of the machine connecting element and pin mount block and between the element and the tension assembly.

The method of tolerating mis-alignment as disclosed in the preceding paragraph wherein the slot located in the connection to machine element.

The method tolerating mis-alignment as in the preceding paragraph wherein the tension fixing assembly includes a tension means, spring assembly and sliding washer.

The method of tolerating mis-alignment disclosed in the preceding paragraph wherein the spring assembly permits the linear bearing to be rotationally out of level.

To those skilled in the art to which the invention relates, many changes in construction and widely differing embodiments and applications of the invention will suggest themselves without departing from the scope of the invention as defined in the appended claims. The disclosures and the description herein are purely illustrative and are not intended to be in any sense limiting.

BRIEF DESCRIPTION OF THE DRAWINGS

The above and further advantages of this invention may be better understood by referring to the following description, taken in conjunction with the accompanying drawings, in which:

FIG. 1 is a plan view of a linear guide misalignment compensating mechanism;

FIG. 2 is a section A—A of FIG. 1 showing a first sectioned view of the mechanism;

FIG. 3 is a section B—B of FIG. 1 showing a second sectioned view of the mechanism;

FIG. 4 is a plan view showing two linear guides with four linear bearings and the misalignment that the invention is capable of compensating for;

FIG. 5 is an elevation view showing two linear guides with four linear bearings and the misalignment that the invention is capable of compensating for;

FIG. 6 is a plan view showing two linear guides with four linear bearings and the misalignment that the invention is capable of compensating for;

FIG. 7 is an elevation showing two linear guides with four linear bearings and the misalignment that the invention is capable of compensating for;

DESCRIPTION OF THE PREFERRED EMBODIMENTS

Figure 4:
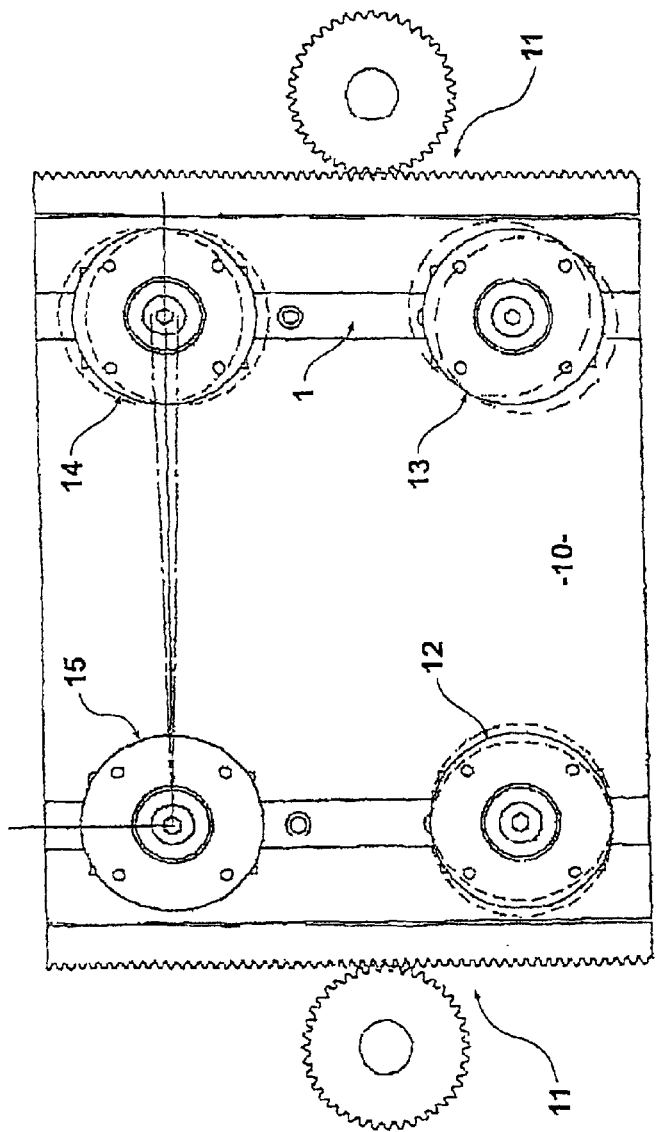

Referring to FIGS. 1–9, shown is a device for permitting and compensating for linear and angular misalignment of two linear guides. A list of the components of the device follows:
Linear Rail Support Structure 1. Linear rail
2. Linear bearing
3. Fulcrum pin mount block
4. Machine connection element
5. Tension bolt
6. Spring assembly
7. Spring assembly sliding washer
8. Slot for movement
9. Friction faces
10. Linear rail support structure
11. Rack and pinion assembly Referring to FIGS. 1, 2 and 3, plan and section AA there is shown a slider block assembly 12 wherein, a support structure (10) is mounted to a linear rail (1). Mounted to this rail (1), in this instance, is a linear recirculating ball bearing block (2). This guide system permits only thousandths of an inch misalignment between two rails. Bolted to this linear bearing (2) is a fulcrum pin mount block (3). Sitting on top, and not directly located relative to this fulcrum pin mount block (3), is a machine element connection (4).

Figure 5:
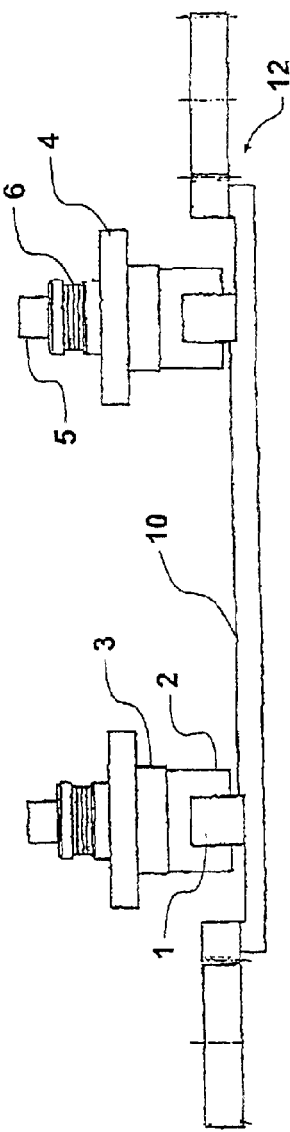

As shown in FIG. 3 a slot (8) is machined in the machine connection element (4) through which the fulcrum pin mount block (3) and a tensioner bolt (5) pass. This slot (8) is machined in three of the four devices as shown in FIG. 4. In FIGS. 4 and 5, a single datum assembly is used to provide the pivot point and has no slot.

Returning to FIGS. 1, 2 and 3, the tensioner bolt (5) and a spring assembly (6) are used to apply a load between a spring assembly sliding washer (7), the machine element connection (4), and the fulcrum pin mount block (3).

When the machine element connection (4) is attached to a rigid moving frame, this upper face is constrained. Misalignment that occurs is due to the relative position of the linear support rail structure (10) and the linear rail (1) changing along the linear guide.

When the load from the tensioner bolt (5) and the spring assembly (6) is applied, the force required to permit the machine element connection (4) to slide relative to the fulcrum pin mount block (3) and the spring assembly sliding washer (7) is proportional to the coefficient of friction at the friction faces (9) and the normal load applied. Accordingly, the force required to permit the sliding can be set to be lower than the horizontal force acceptable to the linear rail (1) and the linear bearing (2).

In addition to allowing the relative sliding between the mating faces, the spring assembly washer (7) also permit the linear bearing (2) to be rotationally or angularly out of level. In this instance, the machine element connection (4) pivots on the edge of the fulcrum pin mount block (3).

Referring to FIGS. 3 to 7, shown are four slider block assemblies 12, 13, 14 and 15. In this instance, with a rack and pinion drive (11) for each linear guide, three slotted sliding block assemblies 12, 13 and 14 with slotted machine element connections (4), are used in combination with one datum block assembly, in which there is no clearance between the machine connection element (4) and the fulcrum pin mount block (3). This assembly allow the motors to correct the moving mechanism for squareness relative to the rail with the datum block. The out of squareness compensation these devices permit is shown in hidden detail on FIGS. 6 and 7.

In instances where there is only one drive for the moving mechanism, then two datum block assemblies could be used on the same rail. The squareness of the moving mechanism relative to the datum block assemblies is set and held with connection elements, such as bolts.

Figure 8:
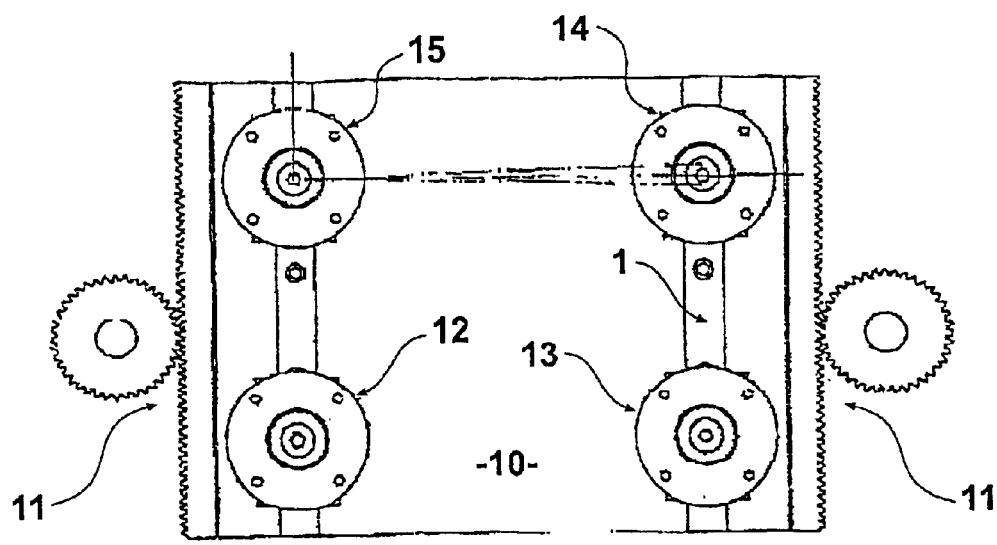
FIG. 8 is a plan view showing the misalignment in alignment of the two rails, compensated for with the invention
Figure 9:
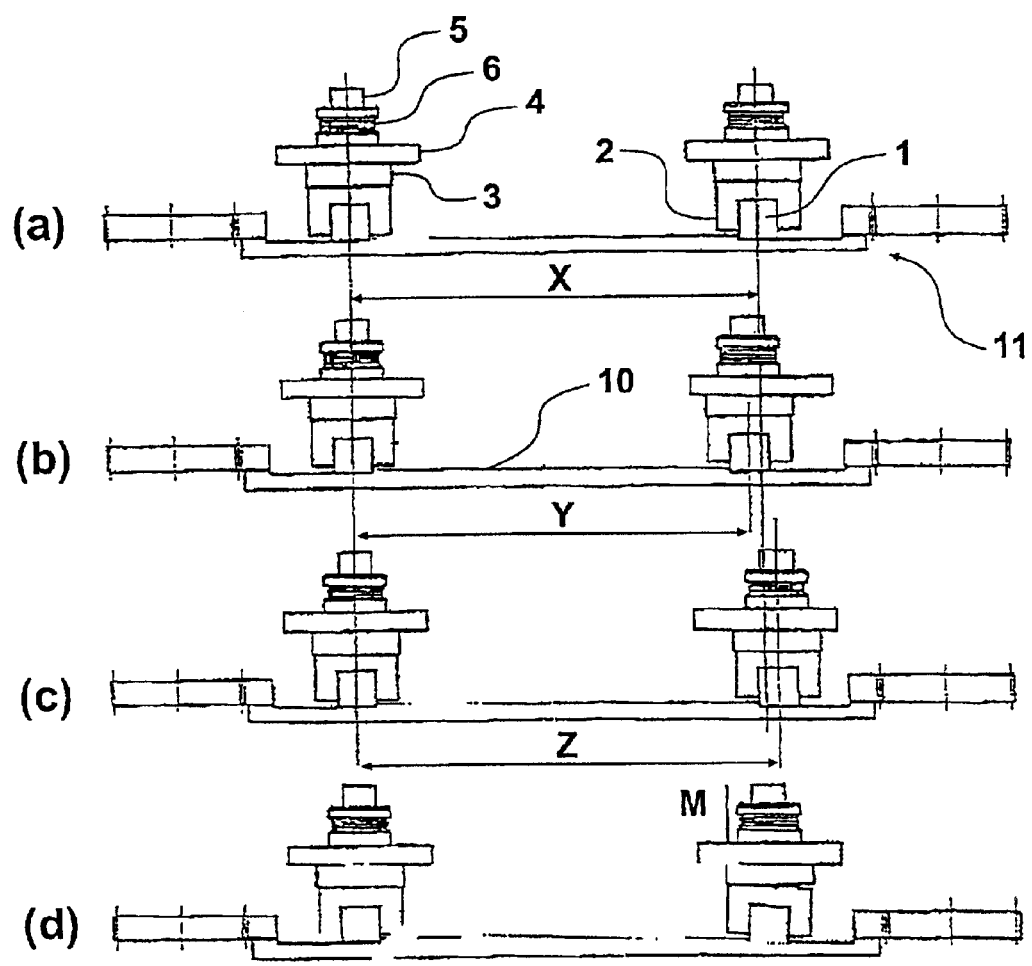
FIGS. 9(a) to (d) are multiple elevations, showing the misalignment in alignment of the two rails, compensated for with the invention.

Finally, referring to FIG. 8 and the elevation views of FIGS. 9(a) to (d) illustrate the misalignment error permitted and compensated for by this device. The theoretical center distance is set by the rigid moving mechanism, to which the machine element connection is bolted. FIGS. 9(a)–(d) show various views of a datum bearing on the left hand side and a slotted bearing on the right hand side with FIG. 9(a) showing the theoretical centre distance A between bearings, FIG. 9(b) shows the minimum distance B between bearings, FIG. 9(c) shows the maximum distance C between the bearings while FIG. 9(d) shows the application of a moment load on the linear bearing applied at a known position M. As can be recognized by those skilled in the art, it is important for true linear movement that the linear guide to which the datum assembly is fitted is straight and level.

Throughout the description of this specification the word "comprise" and variations of that word, such as "comprising", are not intended to exclude other additives, components, integers or steps.

What is claimed is:

1. A compensating device assembly for tolerating misalignment of linear guides supporting a moving axis mounting a machine, the compensating device comprising a plurality of mounting blocks wherein the blocks include at least one datum block and at least three non datum blocks attached to the linear guides wherein the non datum blocks have error alignment means provided by slots therein and sliding friction between movable surfaces thereof such that errors in alignment between the linear guides can be accommodated by adjustment of the non datum blocks to thereby reduce the loads induced in the guides from misalignment.

2. The compensating device assembly as claimed in claim 1 wherein the non datum blocks include a machine connection element, and the linear guides are mounted to a support, and wherein the friction sliding for alignment correction occurs on opposing surfaces of the machine connection element rather than between the linear guides and the support.

3. The compensating device assembly as claimed in claim 2 wherein each block is provided with a bearing, a pin mount block, a machine connection element and tension fixing assembly wherein the bearing is slidably connected to the linear guide, the pin mount block is connected to the bearing, and the machine connection element is connected to the pin mount block by the fixing assembly.

4. The compensating device assembly as claimed in claim 3 wherein the slots are located in the machine connection elements such that the pin mount block and tension fastener pass therethrough.

5. The compensating device assembly as claimed in claim 4 wherein the support comprises a movable platform, and the linear guides include at least two substantially parallel support rails mounted on each side of the movable platform, the platform having sides and a length.

6. The compensating device assembly as claimed in claim 5 wherein the tension fixing assembly includes a tension means, spring assembly and sliding washer.

7. The compensating device assembly as claimed in claim 6 wherein the spring assembly permits the linear bearing to be rotationally out of level.

8. The compensating device assembly as claimed in claim 7 wherein the platform is movable by operation of a moving means attached to each side of the platform.

9. The compensating device assembly as claimed in claim 8 wherein the moving means comprises a rack and pinion assembly.

10. The compensating device assembly as claimed in claim 9 wherein the pin mount block is a linear recirculating ball bearing block.

11. The compensating device assembly as claimed in claim 10 wherein the mounting blocks are slider blocks.

12. The compensating device assembly as claimed in claim 11 wherein the machine connection element of the datum block has no slot to allow for adjustment.

13. A method of compensating misalignment of a machine mounting on a moving axis, the moving axis including a plurality of linear guides on a movable support structure, wherein the compensating device comprises a plurality of mounting blocks attached to the movable support structure, the method comprising the following steps:
   providing a datum block assembly;
   providing at least one non datum block assembly having mating surfaces therebetween;
   attaching and fixing the datum block to a linear guide on the movable support structure;
   attaching and fixing the non datum blocks to the linear guides;
   affixing a machine to the blocks; and
   adjusting the non datum blocks until in alignment through sliding between the mating surfaces of the non datum block assemblies rather than between the linear guide and the support structure,
   wherein errors in alignment between the linear guides can be accommodated by adjustment of the non datum blocks to thereby reduce the loads induced in the linear guides from misalignment.

14. The method as claimed in claim 13 wherein the adjusting of the non datum blocks is carried out while pivoting the machine on the datum block.

15. The method as claimed in claim 14 wherein the non-datum blocks have a slot for adjustable horizontal movement.

16. The method as claimed in claim 15 wherein each block is provided with a bearing, a pin mounting block, a machine connection element and an adjustable fixing assembly wherein the bearing is slidably connected to the linear guide, the pin mounting block is connected to the bearing, and the machine connection element is connected to the pin mounting block by the tension fixing assembly.

17. The method as claimed in claim 16 wherein the sliding occurs between surfaces of the machine connecting element and pin mount block and between the machine connecting element and the tension assembly.

18. The method as claimed in claim 17 wherein the slot is located in the machine connection element.

19. The method as claimed in claim 18 wherein the tension fixing assembly includes a tension means, spring assembly and sliding washer.

20. The method as claimed in claim 19 wherein the spring assembly permits the linear bearing to be rotationally out of level.

* * * * *